(12) United States Patent
Park et al.

(10) Patent No.: US 11,483,436 B2
(45) Date of Patent: Oct. 25, 2022

(54) ABNORMALITY DETERMINATION FOR PRINTER ENGINE USING VIBRATION INFORMATION THEREOF

(71) Applicant: Hewlett-Packard Development Company, L.P., Spring, TX (US)

(72) Inventors: Kiho Park, Pangyo (KR); Minkeun Song, Suwon (KR); SaeJin Park, Pangyo (KR); Yong-Ho You, Pangyo (KR); Sungdae Kim, Suwon (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/312,160

(22) PCT Filed: Mar. 11, 2020

(86) PCT No.: PCT/US2020/021994
§ 371 (c)(1),
(2) Date: Jun. 9, 2021

(87) PCT Pub. No.: WO2020/214284
PCT Pub. Date: Oct. 22, 2020

(65) Prior Publication Data
US 2022/0053096 A1    Feb. 17, 2022

(30) Foreign Application Priority Data
Apr. 19, 2019 (KR) .......................... 10-2019-0046224

(51) Int. Cl.
*H04N 1/00* (2006.01)
*H04N 1/23* (2006.01)

(52) U.S. Cl.
CPC ....... *H04N 1/00034* (2013.01); *H04N 1/0005* (2013.01); *H04N 1/00015* (2013.01);
(Continued)

(58) Field of Classification Search
CPC . H04N 1/00002–00092; H04N 1/2315; H04N 1/2346; H04N 1/2376; H04N 1/2392; H04N 1/29; H04N 1/295; G03G 15/55; G03G 15/751; G03G 15/757; G03G 2215/0154; G06K 15/408
See application file for complete search history.

(56) References Cited

U.S. PATENT DOCUMENTS 7,286,776 B2 * 10/2007 Morita ............... G03G 15/0121
399/36
7,554,574 B2 * 6/2009 Shoji ..................... G06F 3/1284
399/9
(Continued)

FOREIGN PATENT DOCUMENTS

JP     H11208069 A     8/1999
JP     2001328246 A    11/2001
(Continued)

*Primary Examiner* — Scott A Rogers
(74) *Attorney, Agent, or Firm* — Trop Pruner & Hu, P.C.

(57) ABSTRACT

An image forming apparatus includes a printer engine, a sensor and a processor. The printer engine forms an image. The sensor outputs vibration information associated with a vibration of the printer engine. The processor determines whether at least one component of the printer engine has an abnormality based on the output vibration information.

20 Claims, 11 Drawing Sheets

(52) U.S. Cl.
CPC ..... *H04N 1/00029* (2013.01); *H04N 1/00079* (2013.01); *H04N 1/2346* (2013.01); *H04N 1/2392* (2013.01); *H04N 1/00244* (2013.01); *H04N 2201/0094* (2013.01)

(56) References Cited

U.S. PATENT DOCUMENTS

| | | | |
|---|---|---|---|
| 7,945,397 B2* | 5/2011 | Kar | G01M 13/021 |
| | | | 702/34 |
| 9,250,596 B2* | 2/2016 | Nagao | G03G 15/0435 |
| 9,864,315 B2* | 1/2018 | Baba | G03G 15/5091 |
| 10,877,421 B2* | 12/2020 | Okumura | G03G 15/55 |
| 2004/0160502 A1 | 8/2004 | Kumamoto et al. | |
| 2005/0262394 A1 | 11/2005 | Yasukawa et al. | |
| 2011/0187782 A1 | 8/2011 | Miyazawa | |
| 2012/0330614 A1* | 12/2012 | Kar | G01H 1/003 |
| | | | 702/185 |
| 2017/0176286 A1 | 6/2017 | Miyamori et al. | |
| 2019/0281172 A1* | 9/2019 | Baba | G06N 5/045 |

FOREIGN PATENT DOCUMENTS

| | | | |
|---|---|---|---|
| JP | 2007108517 A | | 4/2007 |
| JP | 2011186125 A | * | 9/2011 |
| JP | 2014002003 A | | 1/2014 |
| JP | 2018078421 A | | 5/2018 |
| WO | WO-2020162426 A1 | * | 8/2020 |

* cited by examiner

FIG. 4

| NO. | NAME | FREQUENCY 1[Hz] | FREQUENCY 2[Hz] |
|---|---|---|---|
| 1 | Fuser Belt | 1 | - |
| 2 | Gear 1 | 2 | 95 |
| 3 | Gear 2 | 3 | 80 |
| 4 | Gear 3 | 2.5 | 100 |
| 5 | Gear 4 | 2 | 100 |

ABNORMALITY DETERMINATION FOR PRINTER ENGINE USING VIBRATION INFORMATION THEREOF

CROSS-REFERENCE TO RELATED APPLICATION(S)

This application is based on and claims priority under 35 U.S.C. § 119 to Korean Patent Application No. 10-2019-0046224, filed on Apr. 19, 2019, in the Korean Intellectual Property Office, the disclosure of which is incorporated by reference herein in its entirety.

BACKGROUND

An image forming apparatus may include an apparatus for generating, printing, receiving, transmitting, and the like, of image data, and a representative example of the image forming apparatus is a printer, a copier, a facsimile, or a multifunction peripheral (MFP) that combines the functions thereof.

BRIEF DESCRIPTION OF THE DRAWING

FIG. 4 is a table of frequency information associated with components of an example image forming apparatus;

DETAILED DESCRIPTION

In the following description, with reference to the drawings, the same reference numbers are assigned to the same components or to similar components having the same function, and overlapping description is omitted.

In the present disclosure, an element may be referred to as being "connected" with another element, to include cases of being directly connected, and also cases of being connected indirectly, for example with another element therebetween. Also, an element may be referred to as "including" another element, to indicate that the element may not exclude another element and may further include additional elements, unless specifically stated otherwise.

In the present disclosure, the term "image forming job" may refer to various jobs (e.g., printing, scanning or faxing) related to an image, such as forming the image or generating/storing/transmitting an image file. The term "job" may refer to an image forming job in some examples, and may also mean a series of processes necessary for performing the image forming job in other examples.

The term "image forming apparatus" may refer to an apparatus that prints print data generated by a terminal apparatus, such as a computer on a recording paper. Examples of such an image forming apparatus include a copier, a printer, a facsimile, or a multi-function printer (MFP) that combines functions thereof through a single apparatus.

The term "contents" may mean all types of data that are subject to image forming job, such as a photo, an image, a document file, or the like.

In addition, the term "print data" may mean data converted into a printable format by the printer. When the printer supports direct printing, the file itself may be print data.

Also, the term "user" may mean a person who performs an operation related to the image forming operation using an image forming apparatus or a device connected with the image forming apparatus by wired or wirelessly. The term "manager" may mean a person who has authority to access all functions and systems of the image forming apparatus. The "manager" and the "user" may be the same person.

Figure 1:
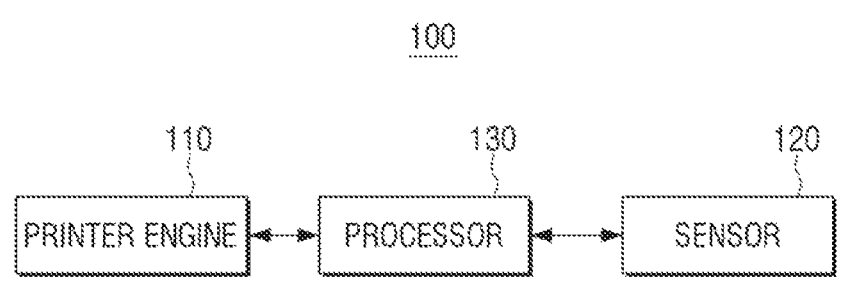
FIG. 1 is a block diagram schematically illustrating a configuration of an image forming apparatus according to an example.

FIG. 1 is a block diagram that schematically illustrates a configuration of an image forming apparatus according to an example.

Referring to FIG. 1, an example image forming apparatus 100 may include a printer engine 110, a sensor 120, and a processor 130.

The example image forming apparatus 100 may obtain vibration information by sensing vibration generated inside the image forming apparatus 100, and determine whether there is an abnormality in the image forming apparatus 100 using the obtained vibration information.

The printer engine 110 may form an image onto a printing paper using various printing methods such as an electrographic method, an inkjet method, a thermal transfer method, a direct thermal method, or the like.

To carry out an electrographic method, the printer engine 110 may include a photosensitive drum, a charger, an exposure device, a developing device, a transfer device, and a fuser 200 which will be described with reference to FIG. 2.

According to examples, the printer engine 110 may include various types of components. For example, the printer engine 110 may include a motor, a gear, and the like, for providing power. When an abnormality (e.g. an abnormal operation) occurs in a specific component of the printer engine 110, abnormal vibration may occur during the operation of the printer engine 110.

The sensor 120 may output vibration information associated with the vibration of the printer engine 110. In some examples, the sensor 120 that is arranged inside or around the printer engine 110 may measure the acceleration of the vibration of the printer engine 110 and output the measured acceleration as vibration information. The position of the sensor 120 will be described later in relation to FIG. 3.

The sensor 120 may be an accelerometer. For example, the sensor 120 may be an accelerometer of a movable coil type, a piezoelectric type, a capacitive type, a strain gauge type, a servo type or a linear variable differential transformer type, or may be a micro electro-mechanical systems (MEMS) triaxial accelerometer.

In some examples, the sensor 120 may include a separate processor. In this case, the sensor 120 may generate frequency analysis information by analyzing the frequency of the vibration information of the printer engine 110 using the processor, and/or generate level analysis information of the vibration information of the printer engine 110 according to time.

In some examples, the outputted vibration information may include at least one of the frequency analysis information of the vibration information of the printer engine 110 or the level analysis information according to time of the vibration information of the printer engine 110.

The processor 130 controls each configuration in the image forming apparatus 100. The processor 130 may include a single device such as a central processing unit (CPU), or include a plurality of devices such as a clock generation circuit, CPU, a graphic processor, or the like.

The processor 130 may identify a component in which an abnormality has occurred, from among a plurality of components. For example, the processor 130 may identify the component in which the abnormality has occurred, from among the plurality of components, using the vibration information of the printer engine 110. An example operation will be described.

The processor 130 may determine whether the image forming apparatus 100 is operating in a warming-up mode or a calibration mode.

In some examples, the warming-up mode means a mode in which the image forming apparatus 100 performs a test run for each part of the printer engine 110, and supplies power to set the fuser 200 at a preset temperature. In some examples, the calibration mode means a mode in which a concentration of each toner in colors of cyan C, magenta M, yellow Y, and black B is calibrated.

In both modes described above, a speed of the motor in the printer engine 110 is maintained and thus, a change in vibration of the printer engine 110 due to a change in speed of the motor may be minimized. Therefore, the processor 130 may identify components that have an abnormality, among the plurality of components, more accurately using vibration information of the printer engine 110 that is outputted from the sensor 120 during the operation in either of the above-mentioned modes.

The processor 130 may additionally determine whether the temperature of the fuser 200 is greater than or equal to a predetermined temperature.

In some examples, a lubricant such as grease may be applied to the fuser belt or the heating roller of the fuser 200, which will be described later with reference to FIG. 2, to reduce frictional force. The applied grease may act as a load at a low temperature and may affect the vibration of the printer engine 110.

The processor 130 may determine whether the temperature of the fuser 200 achieves a threshold temperature, e.g., the temperature of the fuser 200 has a temperature equal to or greater than a predetermined temperature (for example, 150 degrees Celsius). If the temperature of the fuser 200 is equal to or greater than the predetermined temperature (e.g. the threshold temperature), the processor 130 may more accurately determine whether each component has an abnormality using the vibration information of the printer engine 110 that is outputted from the sensor 120. In order to measure the temperature of the fuser 200, the image forming apparatus 100 may include a temperature sensor.

The processor 130 may analyze frequency of the vibration of the printer engine 110 using vibration information associated with vibration of the printer engine 110 that is outputted from the sensor 120.

In some examples, the processor 130 may analyze the frequency of vibration of the printer engine 110 by converting the outputted vibration information to the frequency region using Fourier transform.

In the process of obtaining the vibration information of the sensor 120 with a specific sampling rate by the processor 130, the result of the Fourier transform may be inaccurate due to an error caused by a clock generator inside the sensor 120. Accordingly, the processor 130 may measure the time period for collecting actual data to remove or compensate for the error, to correct the result of the Fourier transform using the measured time.

The processor 130 may identify a component in which an abnormality has occurred, from among a plurality of components, using the analyzed frequency information.

In some examples, the processor 130 may identify a component in which an abnormality has occurred, from among a plurality of components, using the analyzed frequency information and a plurality of frequency information associated with each of the plurality of components. The plurality of frequency information associated with each of the plurality of components may include a plurality of frequency information associated with the characteristics of each of the plurality of components.

For example, when the component is a photosensitive drum, the frequency information associated with the photosensitive drum may include rotational frequency information associated with rotational speed of the photosensitive drum, and include harmonic frequency information that is a multiple frequency of the rotational frequency described above. In addition, when the component is a gear, frequency information associated with the gear may include rotational frequency information or a gear mesh frequency (GMF) information. A further description will follow with reference to FIG. 4.

In some examples, the processor 130 may determine a level of frequency associated with each component among the analyzed frequency information, for each of the plurality of components, and determine whether there is any abnormality by comparing the identified level of the frequency with a frequency reference value associated with each component.

For example, if the frequency associated with a component A is 1 Hz, the processor 130 may determine the level (value) of 1 Hz from among the analyzed frequency information. The processor 130 may determine when an abnormality has occurred by comparing the identified 1 Hz value with the frequency reference value associated with the component A.

The frequency reference value that corresponds to each component may refer to the level of the frequency associated with the component from among the frequencies at which the vibration of the printer engine 110 is analyzed, when each component is in a normal state.

The reference value associated with each component may be generated by the processor 130 based on the vibration information of the printer engine 110 when the image forming apparatus 100 initially operates after the installation.

For example, the processor 130 may analyze the initial frequency of vibration of the printer engine 110 using the vibration information of the printer engine 110 that is outputted through the sensor 120 during the initial operation of the image forming apparatus 100. The processor 130 may determine the level of the frequency associated with each component among the analyzed initial frequency, and generate the identified level of the frequency as a frequency reference value associated with each component. The above-described method of generating the frequency reference value associated with each component is one example, among other example methods that may be adopted.

As a result of comparing the identified level of the frequency with the frequency reference value associated with each component, for each of the plurality of components, if there is a difference of a predetermined ratio or more (e.g., a threshold ratio), the processor 130 may determine that an abnormality has occurred for the component. If there is a difference which is less than the predetermined ratio, the processor 130 may determine that no abnormality has occurred for the component.

In some examples, the predetermined ratio may mean maximum variation of ratio that a specific component could have during a normal operation. The predetermined ratio may be set to have a different ratio for each of the plurality of components. The above-described method for setting a predetermined ratio is one example among other example methods that may be adopted.

For each of the plurality of components, the processor 130 may determine a state of the plurality of the components among three or more states, in addition to determining the normal state or the abnormal state.

For example, the processor 130, for each of the plurality of components, may determine a state of the components, among a normal state in which the components have no or negligeable abnormality, a warning state which indicates increased stress due to repetitive use, an alert state in which an abnormality is expected to occur, and a danger state which is indicative of an abnormality having occurred. The above-described states are examples, and other operational states may be determined, and may be further defined as three states or at least five states, for example.

The processor 130 may determine which states correspond to each of the plurality of components, from among a plurality of states, using a determination criterion for each of the plurality of states.

In some examples, the determination criterion for each of the plurality of states may refer to an estimated value or range of the level of frequency associated with the components, from among the frequency that analyzes the vibration of the printer engine 110, when the component corresponds to each state. The determination criterion for each of the plurality of states may be set for each component. For example, each component may be associated with a unique or different criterion (or set of criteria) for determining each operational state.

The determination criterion may be generated by the processor 130 based on the vibration information of the printer engine 110 when the image forming apparatus 100 initially operates after the installation.

The processor 130 may take an action associated with each state of each component, from among a plurality of states.

In some examples, if the state associated with a component is a normal state, the processor 130 may generate no action associated with the operational state, and if the state is a warning state, the processor 130 may transmit information on the corresponding component to a server (for example, a management server or a service center of a manufacturer).

When the state of a component is the alert state, the processor 130 may transmit information about the component to the server. The processor 130 may further provide a user with a warning message to the effect that an abnormality is expected and with information on the corresponding component (for example, a type of the components, a name of the components, an arrangement position, a countermeasure, and the like).

When the state associated with a component is the danger state, the processor 130 may block a printing operation to prevent failure of other components due to the abnormal component, even if a printing command is inputted (e.g., received).

In particular, when the corresponding component is a component related to the fuser 200 that will be further described with reference to FIG. 2, the processor 130 may control a power supply device 180 not to supply power to the fuser 200.

The processor 130 may generate an operation (e.g., an action) such as displaying a warning message to the effect that the printing function will be restricted and the information on the corresponding component to a user, or the like.

The operations (or actions) that the processor 130 may generate according to a plurality of the states are not limited to the above examples.

Although a simplified configuration of the example image forming apparatus 100 has been described above, the example image forming apparatus 100 may include various additional configurations and features, as will be described with reference to FIG. 2 below.

Figure 2:
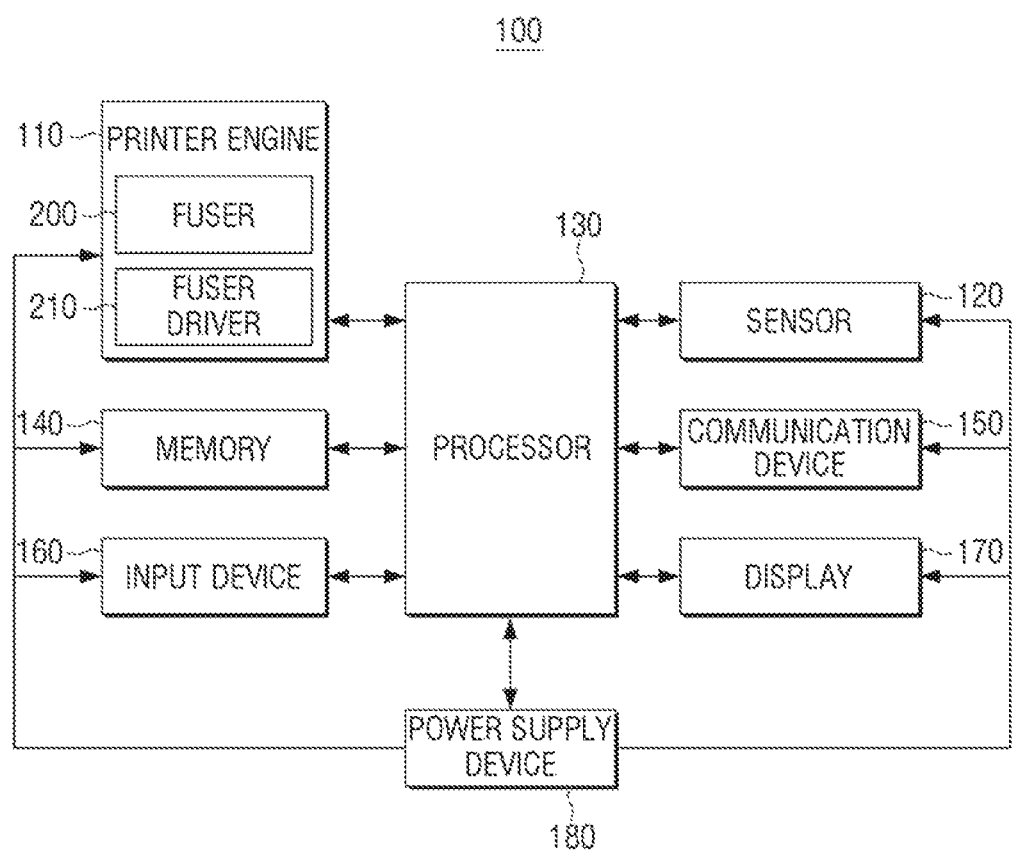
FIG. 2 is a block diagram schematically illustrating a configuration of an image forming apparatus according to an example.

FIG. 2 is a block diagram which schematically illustrates an configuration of an example image forming apparatus.

The image forming apparatus 100 according to the example may include the printer engine 110, the sensor 120, the processor 130, a memory 140, a communication device 150, an input device 160, a display 170, and a power supply device 180.

The sensor 120 may perform the same or a similar function as in the configuration of FIG. 1. The printer engine 110 and the processor 130 have been described with reference to FIG. 1, and may include similar features in the configuration illustrated in FIG. 2.

The printer engine 110 may include the fuser 200 and a fuser driver 210.

The fuser 200 may fix a visible image onto the printing paper. For example, the fuser 200 may apply heat and pressure to the printing paper to fix the charging toner onto the printing paper. The fuser 200 may include a heating roller (or a fuser belt) and a pressure roller.

The heating roller or the fuser belt may be heated to a predetermined temperature to apply heat to the printing paper so that the charging toner is easily fixed onto the printing paper. The heating roller or the fuser belt includes a heating element (for example, a heater lamp or a halogen lamp) for heating to a predetermined temperature. The heating element may be a single heating element, or may include a plurality of heating elements. Such a heating element may be heated by a power supply provided in the power supply device 180.

The pressure roller provides a high pressure to the printing paper to better fix the charging toner onto the printing paper. For example, the pressure roller may have a surface that is pressed against the heating roller, so that a nip region is maintained between the pressure roller and the heating roller. The pressure roller may include a cylindrical core, with an elastic layer and a release layer around the cylindrical core.

The fuser driver 210 may supply power to the fuser 200. For example, the fuser driver 210 may include a motor and a gear for providing power to drive the heating roller, fuser belt, and/or pressure roller to rotate.

The heating roller and the fuser belt of the fuser 200 may be subjected to more stress due to the effects of high temperature and high pressure, and may be subject to a deformation such as tearing and other damage, or the like. In addition, the gear of the fuser driver 210 may be subject to deformation such as abrasion or pricking (e.g. stabbing) during power supply to the fuser 200. If such a deformation occurs in the heating roller, fuser belt or gear, abnormal vibration may occur in the printer engine 110.

Accordingly, the processor 130 may identify an abnormality in the operation of the heating roller, the fuser belt, or the gear. For example, the processor 130 may identify an abnormality of the heating roller, the fuser belt, or the gear based on a plurality of frequency information associated with each of the heating roller, fuser belt, or gear.

In some examples, the frequency information associated with each of the heating roller, the fuser belt, and the gear may include rotational frequency information associated with the rotational speed of each of the heating roller, the fuser belt, or the gear, and may additionally include the harmonic frequency information of the rotational frequency as described above. In addition, the frequency information associated with the gear may include gear mesh frequency information, and may include harmonic frequency information of the above-described gear mesh frequency. The above-described frequency information may be stored in the memory 140.

In some examples, the processor 130 may determine whether an abnormality has occurred in each of the heating roller, the fuser belt, or the gear based on the vibration information of the printer engine 110 and the frequency information associated with each of the heating roller, the fuser belt or the gear. The operation of identifying the abnormality using the vibration information and the frequency information associated with the components has been described with respect to the operation of the processor 130 and thus redundant description thereon is omitted.

In some examples, the memory 140 may store print data received from an external device. In some examples, the memory 140 may be provided as a storage medium in the image forming apparatus 100. In some examples, the memory 140 may be provided as an external storage medium, a removable disk including a USB memory, a web server via a network, and the like.

The memory 140 may store vibration information that is outputted from the sensor 120, for example when the printer engine 110 operates according to the control of the processor 130.

The memory 140 may store a plurality of frequency information associated with each of the plurality of components. The plurality of frequency information may be stored in the memory 140 at the time of manufacturing of the image forming apparatus 100.

The memory 140 may store frequency reference value information associated with each of the plurality of components. The memory 140 may store the action information associated with each of the plurality of states.

The communication device 150 may perform communication with an external device, for example with an external device positioned near the image forming apparatus 100.

In some examples, the communication device 150 may communicate with the external device via a local area network (LAN), an Internet network, and/or a connection through a universal serial bus (USB) port or wireless communication port (e.g., WiFi 802.11a/b/g/n, Near Field Communication (NFC), Bluetooth). The communication device 150 may be referred to as a transceiver.

When the processor 130 identifies an abnormal component using vibration information of the printer engine 110 and a plurality of frequency information associated with a plurality of components, the communication device 150 may transmit information on the abnormal component to a server (for example, a management server or a service center of a manufacturer).

The image forming apparatus 100 according to an example, may be implemented to analyze the frequency of vibration based on the vibration information of the printer engine 110 directly by way of the processor 130 as described in the example above. The image forming apparatus 100 may further compare the values of the plurality of frequencies, among the analyzed frequencies, associated with the plurality of components with the reference value to determine whether there is an abnormality in the plurality of components. In some examples, the server may perform some of the operations described above.

In some examples, the communication device 150 may transmit the vibration information of the printer engine 110 to the server according to a control of the processor 130.

For example, the communication device 150 may transmit the vibration information that is outputted through the sensor 120 to the server, while the image forming apparatus 100 operates in a warming-up mode or a calibration mode. At this time, the communication device 150 may transmit apparatus information of the image forming apparatus 100 as well.

The server may generate a diagnosis result for each of the components on the basis of the received vibration information and the frequency information associated with each of the plurality of components of the image forming apparatus 100. The diagnosis result may include various information such as a type of the components, the name of the components, and the position of the arrangement, countermeasures, and/or the like, and additionally include various information.

For example, the server may analyze the frequency of the vibration information by using a Fourier transform, identify a plurality of frequencies associated with a plurality of components of the image forming apparatus 100 based on the received apparatus information, and generate the diagnosis result to determine the abnormality of each of the plurality of the components using the analyzed frequency and the information on the frequency associated with each of the plurality of components. The above-described series of operations of the server may be similar to those of the processor 130, and redundant description is omitted.

The communication device 150 may receive a diagnosis result for each of the plurality of components, from the server. The processor 130 may identify a component having an abnormality based on the received diagnosis result.

The communication device 150 may transmit the analyzed frequency to the server according to the control of the processor 130.

For example, the processor 130 may analyze the frequency of vibration based on the vibration information of the printer engine 110, and the communication device 150 may transmit the analyzed frequency to the server.

The server may generate the diagnosis result for each of the plurality of components based on the received analyzed frequency and information on the frequency associated with each of the plurality of components.

The communication device 150 may receive the diagnosis result for each of the plurality of components from the server. The processor 130 may identify a component in which an abnormality has occurred based on the received diagnosis result.

In some examples, the communication device 150 may transmit, to the server, values of a plurality of frequencies associated with the plurality of components that are extracted according to the control of the processor 130.

In some examples, the processor 130 may analyze the frequency of the vibration using the vibration information of the printer engine 110, extract the plurality of frequency values associated with each of the plurality of components, from among the analyzed frequencies, and the communication device 150 may transmit the plurality of extracted frequency values to the server.

The server may generate the diagnosis result for each of the plurality of components based on the received values of the plurality of frequencies.

The communication device 150 may receive the diagnosis result for each of the plurality of the components from the server. The processor 130 may identify a component in which an abnormality has occurred based on the received diagnosis result.

In some examples, the communication device 150 may transmit the vibration information to be used for generating of the frequency reference value or the analyzed frequency information to the server, so that the server may generate the frequency reference value that is necessary for the server to determine an abnormality of the plurality of the components.

For example, the communication device 150 may transmit to the server the vibration information of the printer engine 110 that is outputted through the sensor 120, when the image forming apparatus 100 initially operates.

The server may analyze the frequency using the received vibration information at the time of the initial operation, determine the level of the frequency associated with each component among the analyzed frequency, generate the identified level of the frequency as the frequency reference value that corresponds to each component, and store the same. Then, when receiving the vibration information, the analyzed frequency, or a plurality of extracted frequency values from the image forming apparatus 100, the server may determine whether there is an abnormality in a plurality of the components using the generated reference value.

In some examples, the processor 130 may analyze the initial frequency using the vibration information of the printer engine 110 that is outputted through the sensor 120 when the image forming apparatus 100 initially operates, and the communication device 150 may transmit the analyzed initial frequency to the server.

The server may determine the level of the frequency associated with each component from among the analyzed frequencies, generate and store the identified level of the frequency as the frequency reference value associated with each component.

The input device 160 may receive a function selection command and a control command for a corresponding function. The function may include a printing function, a copy function, a scan function, a fax transmission function, or the like. The function control command may be inputted through a control menu displayed on the display 170. The input device 160 may be a keyboard, a mouse, a touch pad, a touch screen, or the like.

The input device 160 may receive a command for an abnormality identification function of each of the plurality of components. If the input device 160 receives a command for the abnormality identification function from the user, the processor 130 may determine an abnormality of each of the plurality of components using the vibration information of the printer engine 110 and the frequency information associated with each of the plurality of components.

The display 170 may display various information provided by the image forming apparatus 100. For example, the display 170 may display a user interface window for receiving user inputs to various functions to be carried out by the image forming apparatus 100. For example, the display 170 may display a user interface window to receive a selection of a function of the image forming apparatus and receive a selection of an option associated with the function.

The display (or display device) 170 may display information about the abnormal component from among a plurality of components according to the control of the processor 130. The information about the abnormal components may include various information such as a type, a name, an arrangement location, a countermeasure plan, or the like, of the abnormal component.

The power supply device 180 may function to provide power to each element of the image forming apparatus 100. For example, the power supply device 180 may convert an alternating current (A/C) power provided from the outside into a direct current (D/C) power, and provide the converted D/C power to each element of the image forming apparatus 100.

The power supply device 180 may selectively supply the A/C power provided from the outside to the fuser 200. In some examples, the power supply device 180 may selectively provide the A/C power to the fuser 200 according to a control of the processor 130. Accordingly, the power supply device 180 may include a switching element for selectively outputting the A/C power, and include a zero cross sensor for sensing a zero cross of the A/C power.

When the abnormal component, from among the plurality of components, is a component included in the fuser 200 such as the fuser belt or the gear, the processor 130 may control the power supply device 180 to avoid supplying power to the fuser 200 for improved safety.

In some image forming apparatuses of comparative examples, it may be difficult to accurately diagnose which component has an abnormality and a location of the abnormal component, from among the plurality of components. Consequently, the location of a failure in the image forming apparatus is not accurately detectable even after a service engineer visits, and a downtime during which a user cannot use the image forming apparatus may be prolonged.

The image forming apparatus according to the examples described above, may more accurately identify what is an abnormal component, from among a plurality of components, using the vibration information of the printer engine and a plurality of frequency information associated with a plurality of components, and thus, the service cost and downtime may be reduced.

In addition to determining a normal state and an abnormal state for each of a plurality of components, the image forming apparatus may also identify a component in which a failure has not yet occurred and is expected to occur. Accordingly, the component may be replaced before a failure occurs and the failure and ensuing effects may be prevented.

Figure 3:
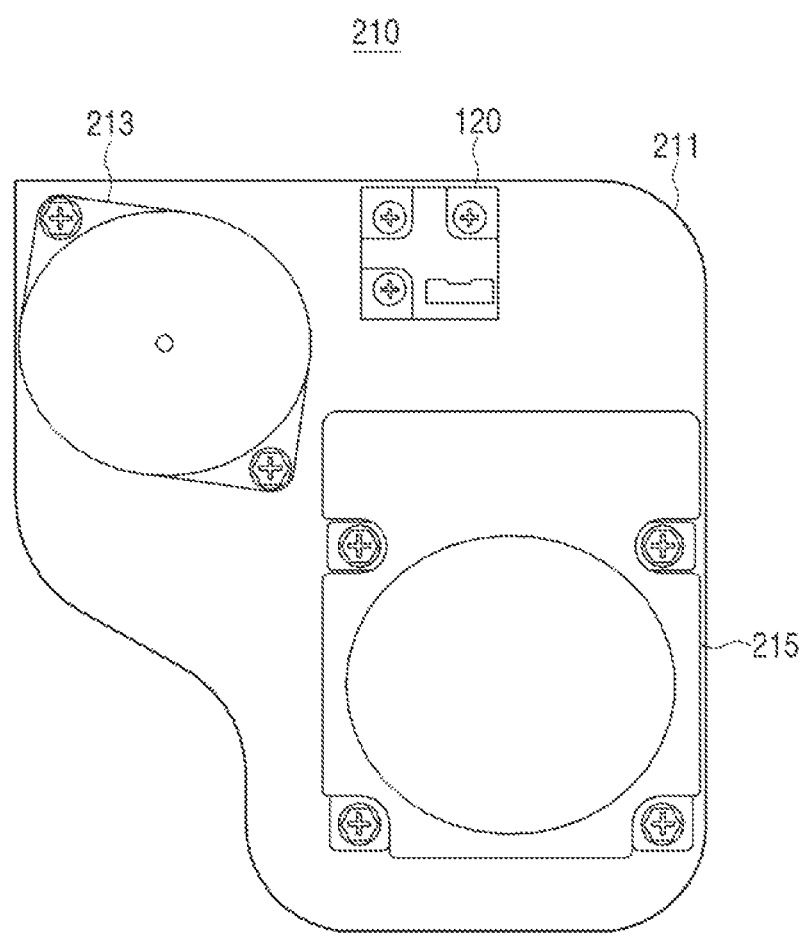
FIG. 3 is a plan view of a fuser driver that includes a sensor.

FIG. 3 is a illustrates an example fuser driver 210 showing an example arrangement and position of a sensor 120.

Referring to FIG. 3, the fuser driver 210 may include a bracket 211, a step motor 213, and a brushless direct current motor (BLDC) motor 215. In addition, the fuser driver 210 may further include a gear for delivering power of the step motor 213 and the BLDC motor 215.

Each of the step motor 213 and the BLDC motor 215 may provide power to a developing device or the fuser 200 of the printer engine 110. In some examples, the step motor 213 and the BLDC motor 215 may be attached to a surface of a bracket 211 to provide power to the developing device or the fuser 200, and may generate vibration in the process.

The sensor 120 may be attached to a surface of the bracket 211 and detect vibration of the printer engine 110. In some examples, the sensor 120 may be an accelerometer to measure acceleration of the printer engine 110 and output the measured acceleration as vibration information.

As shown in FIG. 3, it has been illustrated and described that the sensor 120 is attached to one side of the bracket 211 of the fuser driver 210. In some examples, the sensor may be arranged at a different position inside the printer engine or around the printer engine, and the arrangement position may change (or vary) according to a type of the image forming apparatus.

FIG. 4 is a table of frequency information associated with each of a plurality of components, according to an example.

In some examples, the memory 140 of the image forming apparatus 100 or the memory of the server may store a plurality of frequency information associated with each of the plurality of components. The processor 130 of the image forming apparatus 100 or the processor of the server may identify an abnormality of a plurality of components based on the plurality of frequency information associated with each of the plurality of components. In some examples, the server may be a management server or a service center of a manufacturer. An example operation of the image forming apparatus 100 will be described.

Referring to FIG. 4, the plurality of frequency information associated with each of the plurality of components may include a plurality of frequency information associated with each of the fuser belt and a plurality of gears.

The plurality of frequency information may include rotational frequency information (FREQUENCY 1) associated with rotational speed of each component.

For example, referring to FIG. 4, the memory 140 may store a rotational frequency of 1 Hz associated with the rotational speed of the fuser belt, in association with the fuser belt. The memory 140 may further store a rotational frequency of 2 Hz associated with the rotational speed of a first gear (Gear 1), in association with the first gear (Gear 1).

In order to identify an abnormal component, the processor 130 may: analyze the frequency based on the vibration information of the printer engine 110; identify the level of the rotational frequency of a first gear (Gear 1), a second gear (Gear 2), a third gear (Gear 3), and a fourth gear (Gear 4); and compare the plurality of the identified frequency levels with the frequency reference value associated with each of the first gear (Gear 1), the second gear (Gear 2), the third gear (Gear 3), and the fourth gear (Gear 4).

The frequency reference value associated with the component may refer to the level of the rotational frequency of the component for a normal operation.

In some examples, the frequency information associated with each of the plurality of components may be the same. For example, referring to FIG. 4, the rotational frequencies (FREQUENCY 1) of the first gear (Gear 1) and of the fourth gear (Gear 4) are both of 2 Hz.

In some examples, even when the processor 130 identifies that the level of the frequency at 2 Hz, from among the analyzed frequency, has an abnormally large value, the processor 130 may not identify the particular gear that is associated with an abnormality occurrence, among the first gear (Gear 1) and the fourth gear (Gear 4).

In this case, in order to determine at which gear the abnormality occurs, the processor 130 may use additional frequency information.

Accordingly, a plurality of frequency information may further include gear mesh frequency information (FREQUENCY 2) associated with each gear. For example, referring to FIG. 4, the memory 140 may store 95 Hz as the gear mesh frequency for the first gear (Gear 1), 80 Hz as the gear mesh frequency for the second gear (Gear 2), and 100 Hz as the gear mesh frequency for the third gear (Gear 3) and the fourth gear (Gear 4).

In order to identify an abnormal component, the processor 130 may: identify the level of the gear mesh frequency of each of the first gear (Gear 1), the second gear (Gear 2), the third gear (Gear 3), and the fourth gear (Gear 4), among the analyzed frequencies; and compare the levels of the plurality of identified frequency levels with the frequency reference value associated with each of the first gear (Gear 1), the second gear (Gear 2), the third gear (Gear 3), and the fourth gear (Gear 4).

The frequency reference value associated with each gear may refer to the level of the gear mesh frequency of the gear for normal operation.

For example, referring to FIG. 4, the rotational frequency (FREQUENCY 1) of the first gear (Gear 1) and the fourth gear (Gear 4) are the same (both 2 Hz), but the gear mesh frequencies are 95 Hz and 100 Hz, respectively, and thus different from each other. Therefore, the processor 130 may determine the levels (values) of 95 Hz and 100 Hz from among the analyzed frequencies, and determine that an abnormality occurs to the component (for example, the fourth gear) associated with the frequency (for example, 100 Hz) of which the level is abnormal.

As described above, the processor 130 may more accurately identify which component is associated with an occurrence of an abnormality, by using a plurality of frequency information (e.g., a plurality of frequency information parameters) associated with each component for each of the plurality of components, instead of using one frequency information (e.g., a single frequency information parameter) associated with each component.

The frequency information associated with the component has been described with reference to FIG. 4, to include the rotational frequency and the gear mesh frequency. In some example implementations, the frequency information may additionally include harmonic frequency information which is a multiple frequency of the rotational frequency. In this case, the processor 130 may analyze the frequency using the vibration information of the printer engine 110, and determine (or identify) any abnormality for each of the plurality of components using the analyzed frequency and the information on the harmonic frequency. In yet other examples, the frequency information associated with the component may include additional frequency information, in addition to the above examples.

Figure 5:
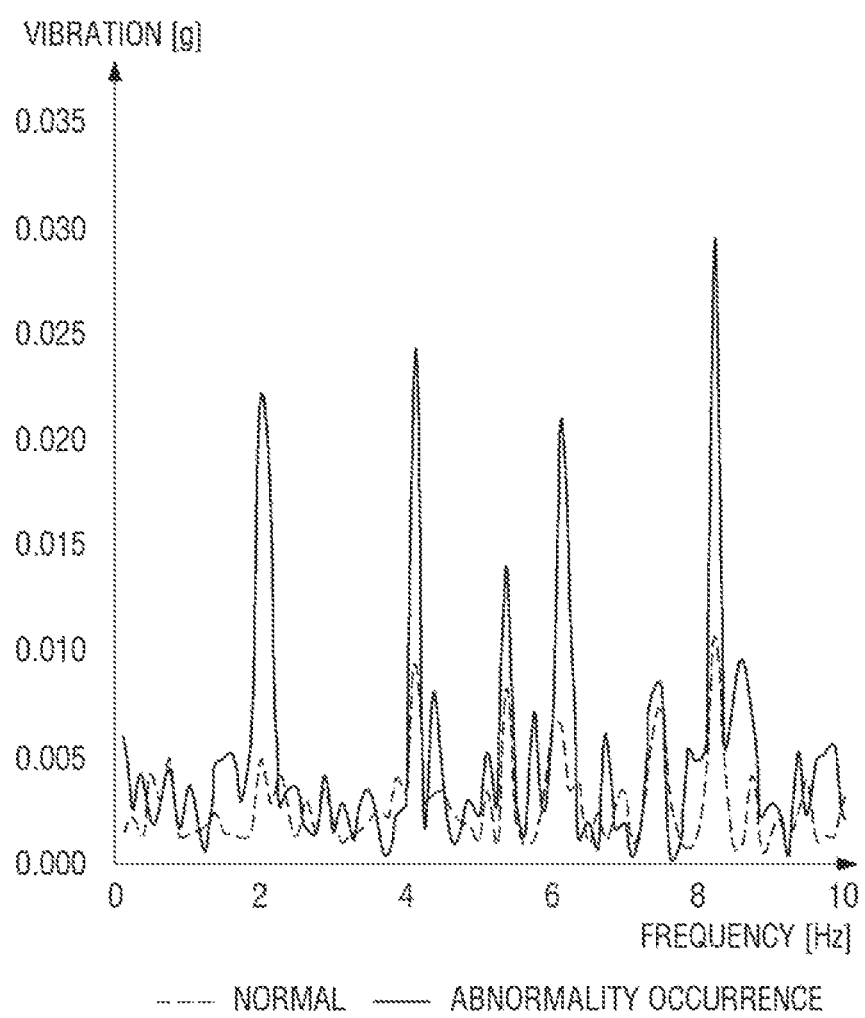
FIG. 5 is a graph illustrating a frequency analysis result of vibration information according to an example.

FIG. 5 is a graph illustrating a frequency analysis result of vibration information according to an example.

The processor 130 may convert the vibration information of the printer engine 110 that is outputted from the sensor 120 to the frequency domain using the Fourier transform, and analyze the level of each frequency by the envelope spectrum. Here, the level of the frequency may be represented in a unit of vibration [g].

The processor 130 may determine whether the component has an abnormality by determining a size or vibration level (e.g., a vibration level or level of frequency) correlated with the frequency of the component, among the analyzed frequencies. Hereinbelow, for better understanding, it will be described, as an example, that the component is a gear and the frequency associated with the gear is a rotational frequency (for example, 2 Hz).

Referring to FIG. 5, the gear with a rotational frequency of 2 Hz has a vibration level of 0.005 g during a normal operation. On the other hand, if an abnormality has occurred in the corresponding gear, the vibration level sensed at a rotational frequency of 2 Hz is 0.025 g. In an example, the gear is associated with a predetermined ratio (or threshold ratio) of 2.5 times.

In this case, the processor 130 may calculate the ratio of the vibration level measured and the vibration level during the normal operation (e.g., 0.0225/0.005), and determine whether the calculated ratio is greater than the predetermined ratio. For example, with reference to FIG. 5, the ratio of the two frequencies (e.g., 0.0225/0.005) is 4.5 times, exceeding the predetermined ratio of 2.5 times and thus, the processor 130 may determine that an abnormality has occurred in the corresponding gear.

In the meantime, in view of the characteristics of the vibration and frequency, a harmonic frequency which is a multiple frequency of the basic frequency, may have similar characteristics to the characteristics of the basic frequency. Referring to FIG. 5, if an abnormality has occurred in the gear, the vibration levels at 4 Hz, 6 Hz, and 8 Hz, which are integer multiples of 2 Hz, have a significantly large value compared to the normal case (e.g., in a normal operation).

Accordingly, the processor 130 may determine whether an abnormality occurs in the gear by considering the rotational frequency of the gear, and also the vibration level at a harmonic frequency.

In some examples, the processor 130 may determine the abnormality of the gear by using the gear mesh frequency of the gear, in addition to using the gear rotational frequency, as will be described below.

Figure 6:
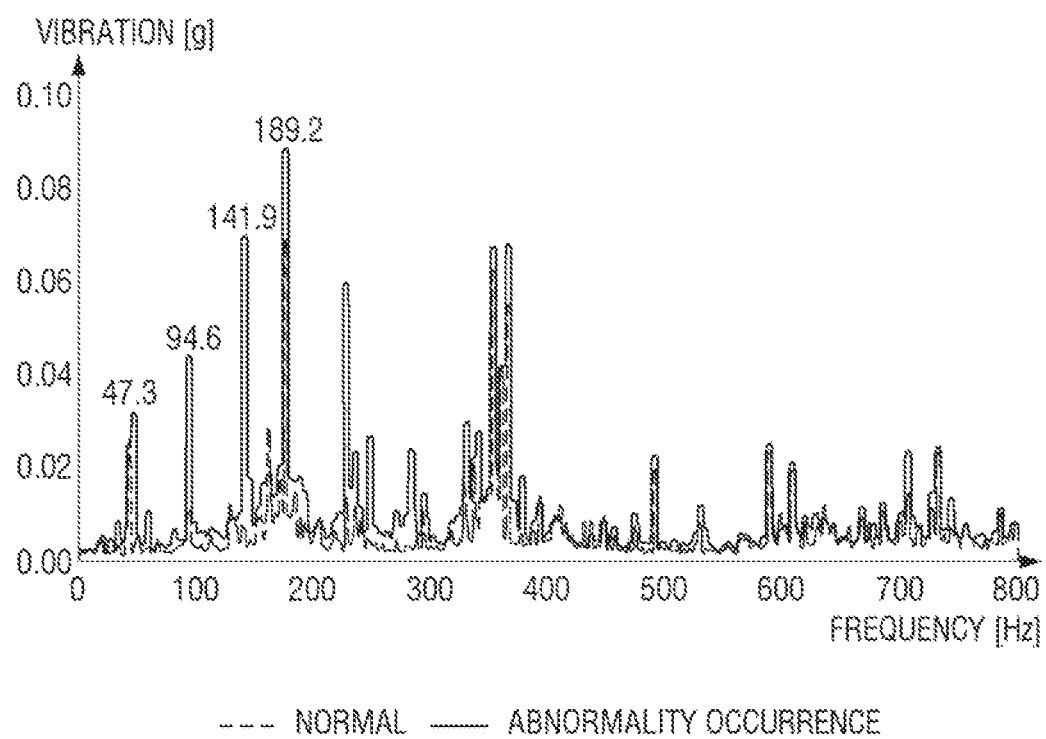
FIG. 6 is a graph illustrating a frequency analysis result of vibration according to an example.

FIG. 6 is a graph illustrating a frequency analysis result of vibration according to another example.

As an example, the component being analyzed may be a gear having a gear mesh frequency of 47.3 Hz, as an example.

Referring to FIG. 6, in an example, if an abnormality has occurred, the gear has a level of about 0.036 g at a frequency of 47.3 Hz. In a normal operation, the corresponding gear has a vibration level of about 0.028 g at a frequency of 47.3 Hz.

The processor 130 may calculate the ratio of the vibration level measured and the vibration level during the normal operation (e.g., 0.0369/0.028), and check whether the calculated ratio (1.3) is greater than the predetermined ratio (2.5). For example, in FIG. 6, the ratio of the two vibration levels (e.g., 0.0369/0.028) is 1.3 times, which is less than the predetermined ratio of 2.5 times and thus, the processor 130 may determine that an abnormality has not occurred in the corresponding gear.

In order to improve the accuracy of the determination, the processor 130 may additionally determine the level at a harmonic frequency of the gear mesh frequency. For example, the processor 130 may determine the vibration level values for the rotational frequencies of 94.6 Hz, 141.9 Hz, and 189.2 Hz, which are multiples of 47.3 Hz, and may compare these levels with the reference level for a normal case.

Referring to FIG. 6, it may be identified that the vibration level values for 94.6 Hz and 141.9 Hz are significantly large compared to the normal case. Therefore, the processor 130 may determine that an abnormality occurs to the gear.

That is, the processor 130 may more accurately determine the occurrence of an abnormality based on the vibration level for the gear mesh frequency of the gear in addition to the vibration levels for the harmonic frequencies of the gear mesh frequency.

The processor 130 may determine whether the printer engine 110 is abnormal using vibration information of the printer engine 110 that is converted in a time domain. An example operation will be described.

Figure 7:
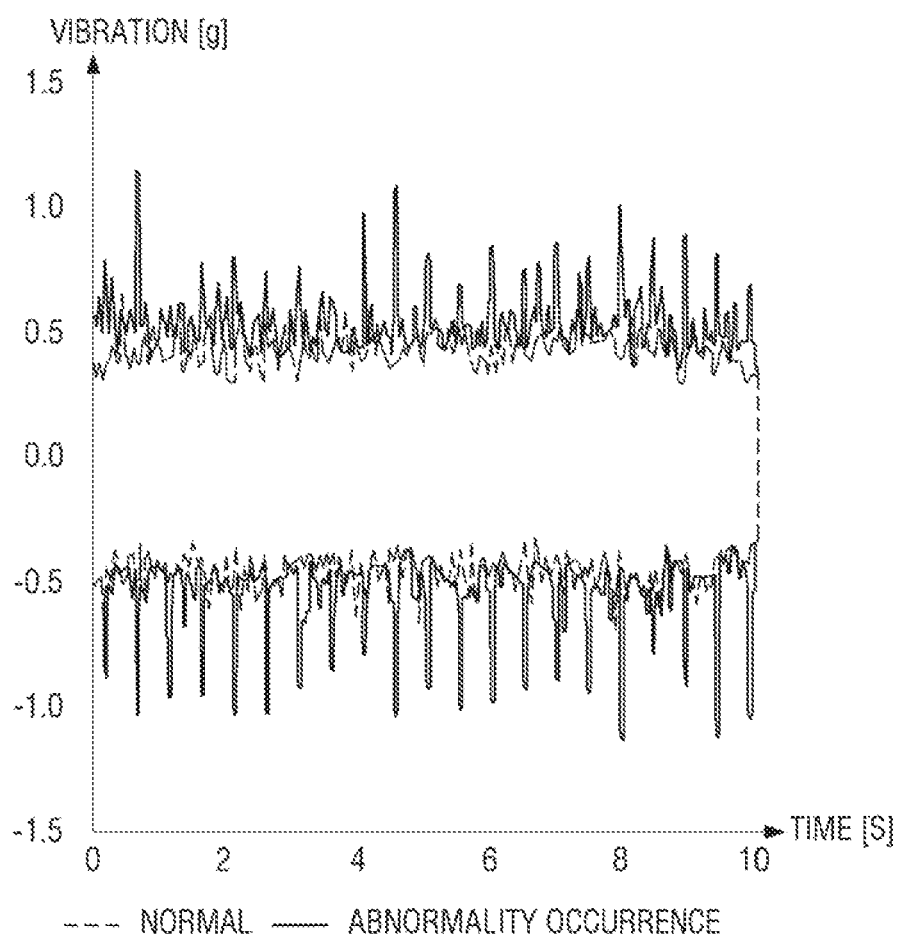
FIG. 7 is a graph illustrating a vibration level analysis result according to time of vibration information according to an analysis example.

FIG. 7 is a graph illustrating a level analysis result according to time of vibration information according to an example.

When performing a specific function, the image forming apparatus 100 may control an operation of components related to the corresponding function. A timing when the components related to the specific function start an operation may be different, respectively.

When one of the components related to the specific function has an abnormality, if the image forming apparatus 100 performs a specific function, an abnormal vibration may occur, and the abnormal vibration may occur at a point of time when the abnormal component starts an operation.

Accordingly, the processor 130 or a server may determine whether there is an abnormality among a plurality of components based on information associated with an operation start time of each of the plurality of components. Hereinafter, in describing the example operation, it is assumed that the processor 130 performs the above-described function.

The processor 130 may analyze the level of the vibration according to time using the vibration information of the printer engine 110. Here, the level of the vibration may be represented using root mean square (RMS), but is not limited thereto.

The processor 130 may compare the level of the vibration at a normal operation with the level of the analyzed vibration to determine a timing when the ratio exceeds the predetermined ratio. Here, the predetermined ratio may refer to a maximum change ratio of the vibration level that the component may have during the normal operation. The predetermined ratio may be stored in the memory 140 at the time of manufacturing the image forming apparatus 100 and may be set to a different ratio for each of the plurality of components to be monitored.

The processor 130 may identify a component in which an abnormality occurs, from among the plurality of components, by identifying which component corresponds to the timing when the predetermined ratio is exceeded, using a plurality of operation timing information associated with each of the plurality of components.

For example, during the calibration function, an operation timing of the first gear may be assumed to be one second after the start of the calibration function. The processor 130 may analyze the level according to the time of the vibration, by using the vibration information of the printer engine 110 that is outputted from the sensor 120 during the performing of the calibration function.

The processor 130 may determine that the level analyzed according to the time of the vibration is greater than the level of the vibration during the normal operation by a predetermined ratio or more. In this case, the processor 130 may determine that the component associated with the one second is the first gear and determine that an abnormality occurs to the first gear, by using a plurality of operation timing information associated with each of the plurality of components.

The processor 130 may identify the abnormal component by considering additional information, in addition to comparing the level of the vibration during the normal operation and the level of the analyzed vibration.

For example, the processor 130 may calculate a crest factor or Kurtosis by using the level information of the vibration analyzed according to time, and identify the abnormal component by additionally considering the crest factor or the Kurtosis.

In some examples, if there is no operation timing information for the plurality of components, the processor 130 may determine the abnormality of the printer engine 110 by exclusively using the vibration information of the printer engine 110 on the time domain.

For example, the processor 130 may analyze the level of the vibration according to time using the vibration information. The processor 130 may determine whether an abnormality occurs to the printer engine 110 by comparing the level of vibration during the normal operation and the level of the analyzed vibration.

For example, referring to FIG. 7, it is possible to determine that the level of the vibration of the normal operation is less than or equal to the level of the vibration of the abnormal operation as a whole. Therefore, the processor 130 may calculate and compare the average level of the vibration of the normal operation and the average level of the analyzed vibration, and if there is a difference that is greater than or equal to a predetermined ratio, the processor 130 may determine that an abnormality occurs in the printer engine 110.

Methods that may be carried out by the processor 130 to determine an abnormality of the printer engine 110 are not limited to the above-described example. An abnormality in the printer engine 110 may be determined by comparing through a calculation of the root mean square error (RMSE), by calculating the crest factor or Kurtosis, or additionally based on the calculated crest factor or a Kurtosis.

If it is determined that an abnormality has occurred in the printer engine 110, the processor 130 may analyze the frequency of the vibration using the vibration information of the printer engine 110. The processor 130 may determine the abnormality among the plurality of components by using the plurality of frequency information associated with each of the plurality of components and the analyzed frequency.

If it is determined that an abnormality has not occurred to the printer engine 110, the processor 130 may consider that an abnormality has not occurred among the plurality of components included in the printer engine 110 and may terminate an operation of determining an abnormality.

As described above, by determining an abnormality of the printer engine 110 first and then performing determination of an abnormality among each of the plurality of components according to the determination result, an unnecessary operation of determining an abnormality among each of the plurality of components even during the normal operation of the printer engine 110 may be prevented.

When a server performs the above operation, the server may receive information about the level of the vibration of the printer engine 110 from the image forming apparatus, and identify the abnormal component by using the level information according to the time of the received vibration.

Examples in which the image forming apparatus 100 identifies an abnormal component, among the plurality of components, via the server will be described.

Figure 8:
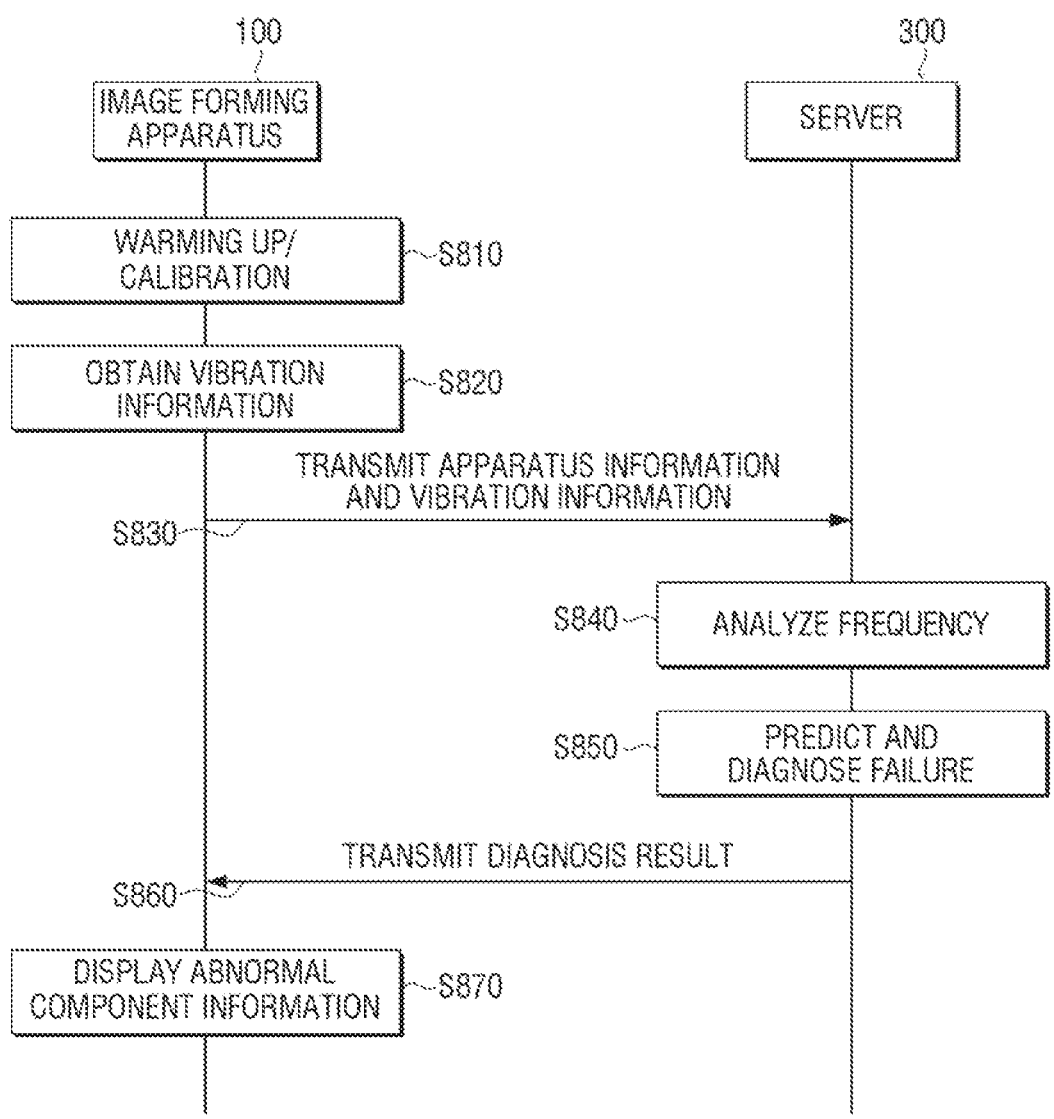
FIG. 8 is a sequence diagram of an abnormal component identification method according to an example.

FIG. 8 is a sequence diagram of an abnormal component identification method according to an example.

Referring to FIG. 8, the image forming apparatus 100 may determine whether the image forming apparatus 100 is operating in a warming-up mode or a calibration mode at operation S810.

In operation, in the warming-up mode or the calibration mode, the image forming apparatus 100 may obtain vibration information associated with the vibration of the printer engine 110 outputted from the sensor 120 at operation S820.

The image forming apparatus 100 may transmit the vibration information obtained with the apparatus information of the image forming apparatus 100 to an external server 300 at operation S830. The server 300 may be a management server or a service center of a manufacturer. In addition, the apparatus information of the image forming apparatus 100 may include model name information of the image forming apparatus 100.

The server 300 may analyze the frequency of the vibration of the printer engine 110 of the image forming apparatus 100 by using the received vibration information at operation S840, for example by converting the received vibration information into a frequency domain by using the Fourier transform.

The server 300 may predict and diagnose failure of the printer engine 110 of the image forming apparatus 100 at operation S850.

In some examples, the server 300 may retrieve a frequency reference value associated with each of the plurality of components and the plurality of frequency information associated with each of the plurality of components of the image forming apparatus 100 using the received apparatus information of the image forming apparatus 100.

The server 300 may generate a diagnosis result for each of the plurality of components by using the retrieved plurality of frequency information, the retrieved frequency reference value, and the analyzed frequency information. The server 300 may operate similarly to the processor 130 as described above, and a redundant description will be omitted.

Prior to transmitting the vibration information used for determining the diagnosis result, to the server 300, the image forming apparatus 100 may transmit to the server 300, the vibration information to be used for generating the frequency reference value or the analyzed frequency information. Accordingly, the frequency reference value associated with each component, to be used for determining an abnormality of the component by the server, may be generated.

For example, the image forming apparatus 100 may transmit the vibration information of the printer engine 110 that is outputted through the sensor 120, to the server 300 during the initial operation of the image forming apparatus 100. Then, the server 300 may analyze the frequency using the vibration information at the time of the initial operation, identify the level of the frequency associated with each component among the analyzed frequency, generate the identified level of the frequency as a frequency associated with each component, and store the reference value.

In some examples, the image forming apparatus 100 may analyze the initial frequency using the vibration information of the printer engine 110 that is outputted through the sensor 120 during the initial operation of the image forming apparatus 100, and transmit the analyzed initial frequency to the server. The server 300 may identify the level of the frequency associated with each component among the analyzed frequency, generate the identified level of the frequency as a frequency reference value associated with each component, and store the reference value.

The server 300 may transmit the diagnosis result to the image forming apparatus 100 at operation S860. Here, the diagnosis result may include information such as a type of a component, a name of a component, an arrangement position, a countermeasure, or the like, and may further include other various information.

The image forming apparatus 100 may display the received diagnosis result at operation S870. For example, the image forming apparatus 100 may identify a component in which abnormality has occurred by using the received diagnosis result, and display information associated with the component, to a user, for example via the display device 170 (FIG. 2). The information displayed may include, for example, a type of the component, the component name, the arrangement location, the countermeasure, and/or the like.

Figure 9:
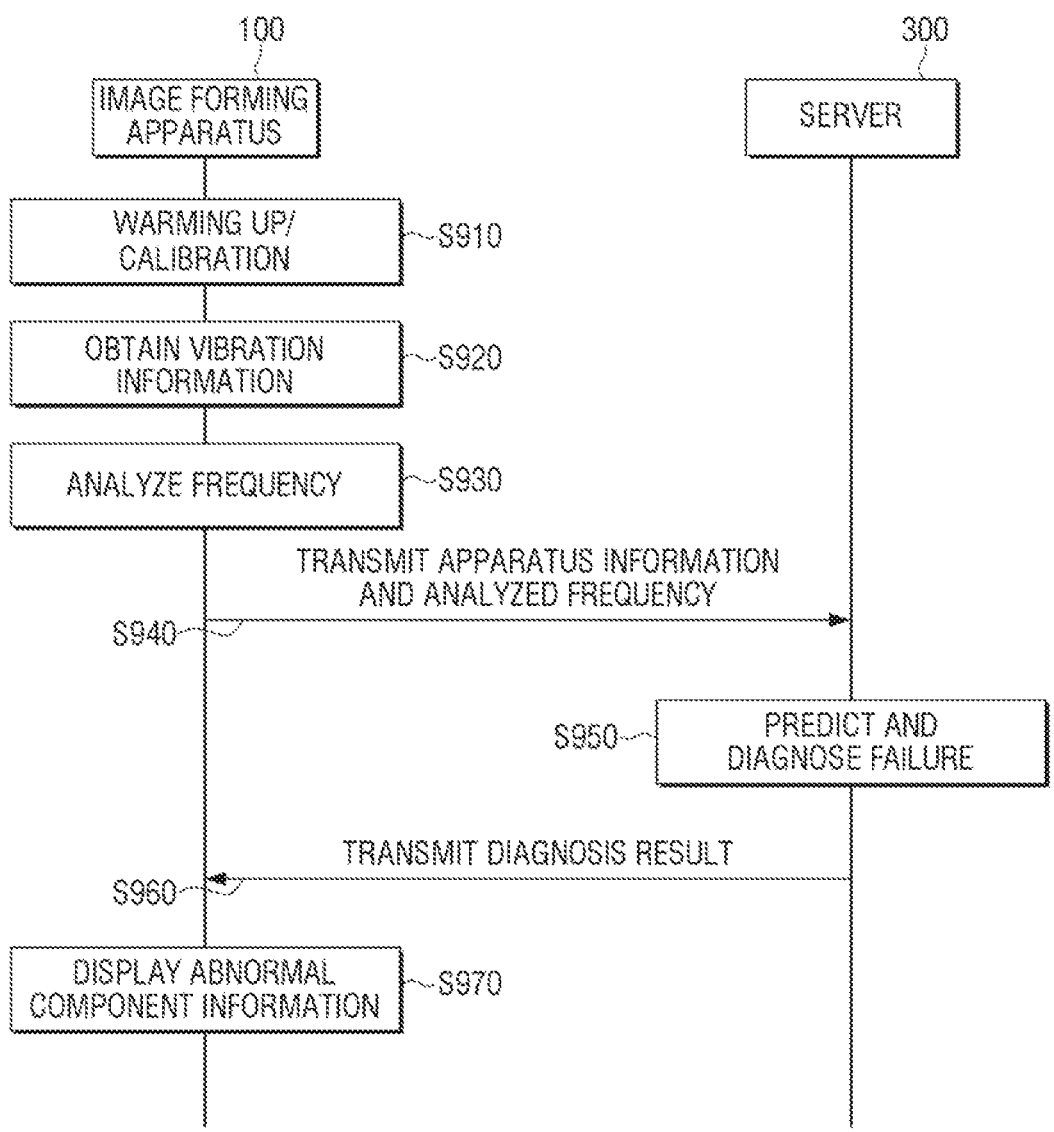
FIG. 9 is a sequence diagram of an abnormal component identification method according to an example.

FIG. 9 is a sequence view of an abnormal component identification method according to another example.

Referring to FIG. 9, the image forming apparatus 100 may determine whether the image forming apparatus 100 is operating in a warming-up mode or a calibration mode at operation S910.

If the image forming apparatus 100 is operating in a warm-up mode or a calibration mode, the image forming apparatus 100 may obtain vibration information associated with the vibration of the printer engine 110 outputted from the sensor 120 in operation S920.

At operation S930, the image forming apparatus 100 may analyze the frequency of the vibration of the printer engine 110 of the image forming apparatus 100 using the obtained vibration information. For example, the image forming apparatus 100 may analyze the frequency of the vibration of the printer engine 110 by converting the vibration information to the frequency domain using a Fourier transform.

The image forming apparatus 100 may transmit the analyzed frequency to the external server 300 together with the apparatus information of the image forming apparatus 100 at operation S940.

The server 300 may predict and diagnose failure of the printer engine 110 of the image forming apparatus 100 at operation S950.

For example, by using the received apparatus information of the image forming apparatus 100, the server 300 may retrieve the frequency reference values associated with each of the plurality of components and the plurality of frequency information associated with each of the plurality of components. The server 300 may generate the diagnosis result for each of a plurality of components using the retrieved plurality of frequency information, the retrieved frequency reference values, and the analyzed frequency information. The server may operate similarly to the above-described processor 130, and a redundant description will be omitted.

Prior to transmitting to the server 300, the vibration information to be used for determining the diagnosis result, the image forming apparatus 100 may transmit to the server 300, the vibration information to be used for the generation of the frequency reference value, or the analyzed frequency information. Accordingly, the frequency reference value associated with each component, may be generated, in order to determine an abnormality of the component by the server 300.

The server 300 may transmit the diagnosis result to the image forming apparatus 100 at operation S960.

The image forming apparatus 100 may display the received diagnosis result at operation S970. For example, the image forming apparatus 100 may identify a component in which an abnormality has occurred using the received diagnosis result, and display the information associated with the abnormal component, to a user, for example via the display device 170 (FIG. 2). The information displayed may include, for example, a type of the component, the name of the component, an arrangement position, a countermeasure, and/or the like.

Figure 10:
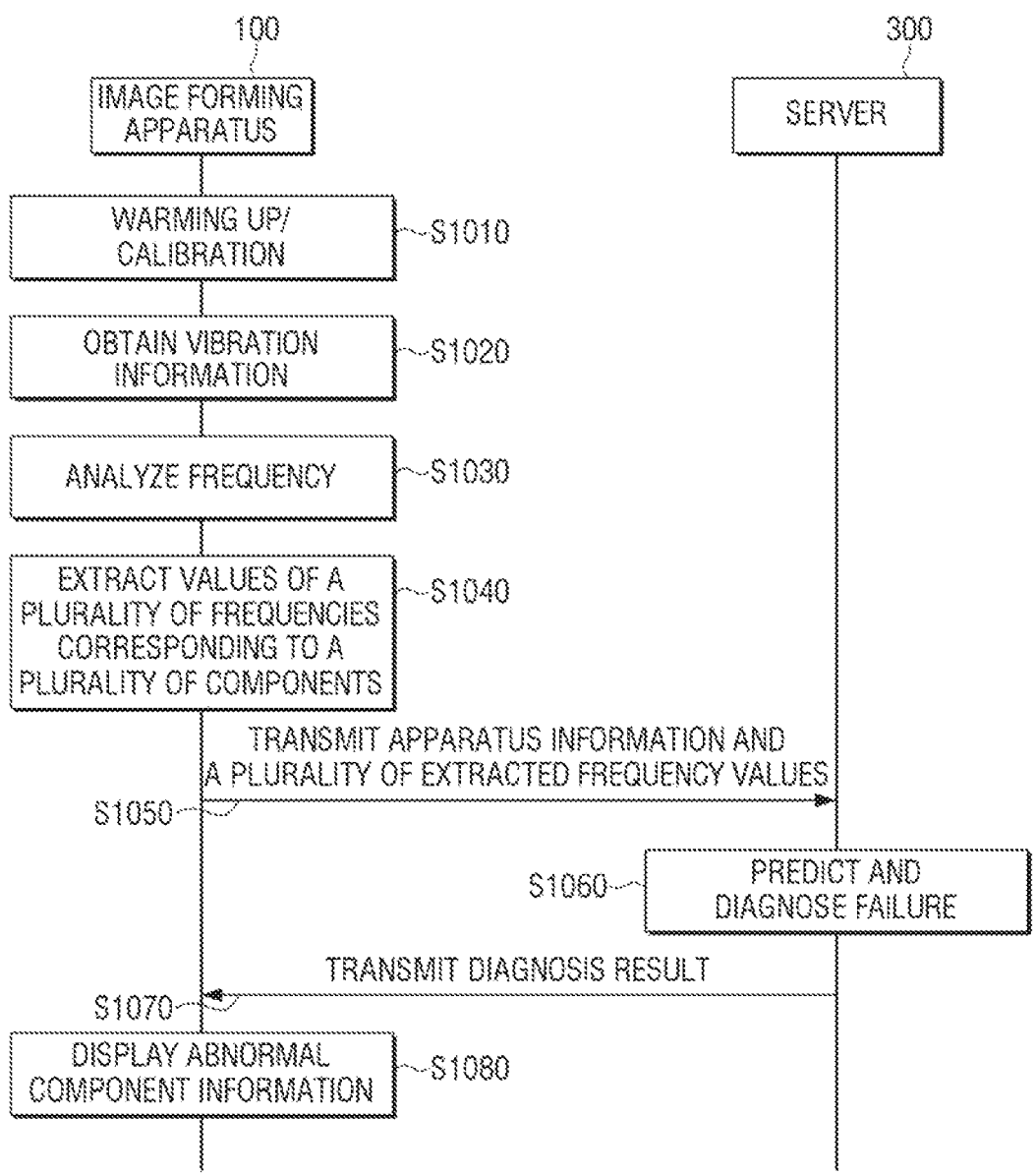
FIG. 10 is a sequence diagram of an abnormal component identification method according to an example.

FIG. 10 is a sequence view of an abnormal component identification method according to an example.

Referring to FIG. 10, the image forming apparatus 100 may determine that the image forming apparatus 100 is operating in the warming-up mode or the calibration mode at operation S1010.

If the image forming apparatus 100 is operating in the warming-up mode or the calibration mode, at operation S1020, the image forming apparatus 100 may obtain the vibration information associated with the vibration of the printer engine 110 that is outputted from the sensor 120.

At operation S1030, the image forming apparatus 100 may analyze the frequency of the vibration of the printer engine 110 of the image forming apparatus 100 using the obtained vibration information. For example, the image forming apparatus 100 may analyze the frequency of the vibration of the printer engine 110 by converting the vibration information to the frequency domain using a Fourier transform.

At operation S1040, the image forming apparatus 100 may extract a plurality of frequency values associated with each of a plurality of components, from the analyzed frequency. For example, the image forming apparatus 100 may extract a plurality of frequency values associated with each of a plurality of components among the analyzed frequencies by using a plurality of frequency information associated with each of the plurality of pre-stored components. The plurality of frequencies associated with each of the plurality of components may include the rotational frequency of the fuser belt or the gear, the gear mesh frequency of the gear, and/or the like.

At operation S1050, the image forming apparatus 100 may transmit the plurality of frequency values extracted together with the apparatus information of the image forming apparatus 100 to the external server 300.

At operation S1060, the server 300 may predict and diagnose the failure of the printer engine 110 of the image forming apparatus 100.

For example, by using the received apparatus information of the image forming apparatus 100, the server 300 may retrieve the frequency reference value associated with each of a plurality of components of the image forming apparatus 100. The server 300 may generate the diagnosis result for each of a plurality of components using the retrieved frequency reference values and the received plurality of frequency values. The server 300 may operate similarly to the processor 130 described above, and redundant description will be omitted.

In some examples, the image forming apparatus 100 may transmit to the server 300, the vibration information, so as to generate a frequency reference value associated with each component, to be used by the server 300 to determine an abnormality in the component, or the analyzed frequency information. At operation S1050, the image forming apparatus 100 may transmit to the server 300, the vibration information to be used for determining the diagnosis result.

The server 300 may transmit the diagnosis result to the image forming apparatus 100 at operation S1070.

The image forming apparatus 100 may display the received diagnosis result at operation S1080. For example, the image forming apparatus 100 may identify a component in which an abnormality has occurred by using the received diagnosis result, and display information on the abnormal component to a user, for example via the display device 170 (FIG. 2). The information displayed may include, for example, a type of the component, the component name, the arrangement location, the countermeasure, and/or the like.

As described above, the image forming apparatus 100 according to the examples of FIGS. 8 to 10 may identify a component in which an abnormality has occurred, from among a plurality of components, through the server 300, and thus, an amount of operations may be reduced.

In the examples of FIGS. 8 to 10, the server 300 transmits the diagnosis result to the image forming apparatus 100 and displays the diagnosis result received by the image forming apparatus 100. In other examples, if the server 300 is a management server of a manufacturer, the diagnosis result may be transmitted to a server of a service provider (for example, a service center) providing a quality warranty service or a customer service for the image forming apparatus 100. In this case, the service provider may provide a service to the image forming apparatus 100 according to a process based on the received diagnosis result.

Figure 11:
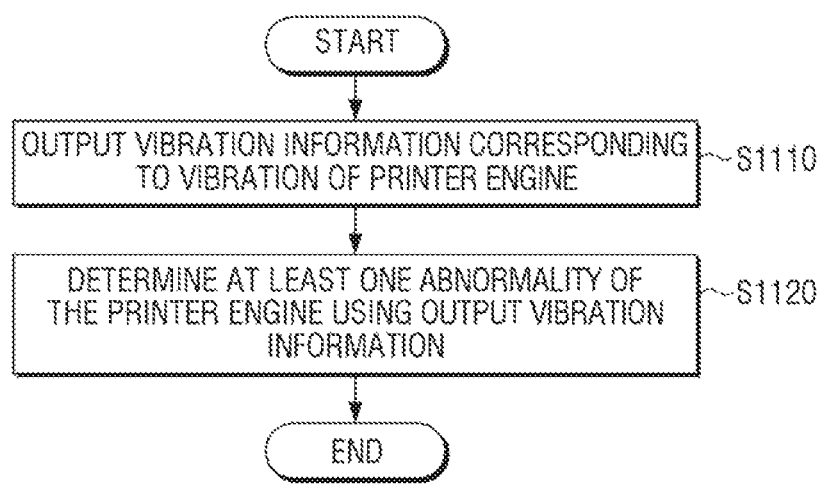
FIG. 11 is a flowchart illustrating a control method carried out by an image forming apparatus according to an example.

FIG. 11 is a flowchart illustrating a control method of an image forming apparatus according to an example.

Referring to FIG. 11, the vibration information associated with the vibration of the printer engine is outputted at operation S1110. For example, the acceleration of the vibration of the printer engine may be measured using a sensor arranged inside or around the printer engine of the image forming apparatus, and the measured acceleration may be outputted as the vibration information. The sensor may be an accelerometer for example.

In some examples, the sensor may include a separate processor. In this case, the sensor may analyze the frequency of the vibration information of the printer engine by using the provided processor to generate frequency analysis information, or the sensor may generate the level analysis information according to the time of the vibration information of the printer engine.

In this case, the outputted vibration information may include at least one selected from the information on the frequency analysis of the vibration information of the printer engine, and the level analysis information according to the time of the vibration information.

In some examples, in order to output vibration information of the printer engine, the image forming apparatus may determine whether the image forming apparatus is operating in the warming-up mode or the calibration mode. If the image forming apparatus is operating in the warming-up mode or the calibration mode, the vibration information associated with the vibration of the printer engine may be outputted.

The warming-up mode may refer to a mode in which power is supplied so that the image forming apparatus conducts a trial run of each part of the printer engine, and sets the temperature of the fuser to a predetermined temperature. In addition, the calibration mode means a mode in which concentration of each toner of colors of cyan C, magenta M, yellow Y, and black B is calibrated.

By using the outputted vibration information, whether the printer engine has at least one abnormality is determined at operation S1120.

In some examples, by converting the outputted vibration information to the frequency domain using a Fourier transform, the frequency of the vibration of the printer engine may be analyzed.

By using the analyzed frequency, a component in which an abnormality has occurred may be identified, from among the plurality of components.

An example method of identifying the component in which an abnormality has occurred, from among a plurality of components, may be performed through the server or in the image forming apparatus.

When the method is performed through the server, the analyzed frequency may be transmitted to the server, and the diagnosis result for each of the plurality of components may be received at the server.

In other examples, a plurality of frequency information associated with each of a plurality of components, a plurality of frequency values associated with each of the plurality of components may be extracted, from among the analyzed frequencies, and the extracted plurality of frequency values may be transmitted to the server. The diagnosis result for each of the plurality of components may be received from the server.

An example method for generating the diagnosis result by the server may be similar to the above-described method of identifying the component in which an abnormality has occurred of the image forming apparatus.

As described above, the component in which an abnormality has occurred may be identified based on the diagnosis result received through the server.

A component in which an abnormality has occurred may be identified inside the image forming apparatus.

A plurality of frequency information associated with each of a plurality of components of the image forming apparatus is stored. The plurality of frequency information associated with each of the components may refer to a plurality of frequency information associated with the characteristics of each of the plurality of components.

For example, the printer engine of the image forming apparatus may include the fuser. In this case, the plurality of frequency information may include rotational frequency information associated with the rotational speed of each of the fuser belt or gear included in the fuser, harmonic frequency information of the rotational frequency, and information on the gear mesh frequency, and the harmonic frequency information of the gear mesh frequency. If the image forming apparatus includes a plurality of gears, rotational frequency information and gear mesh frequency information of each of the plurality of gears may be included.

For each of the plurality of components, whether an abnormality has occurred may be determined by identifying the level of the frequency which corresponds to each component, from among the analyzed frequency information, and by comparing the identified level of the frequency with the frequency reference values associated with each component.

Here, the frequency reference value associated with each component may refer to the level of the frequency associated with a component when the component operates normally. The frequency reference value may be included in a plurality of frequency information associated with each of the plurality of components.

In some examples, as a result of comparing the identified level of the frequency with a frequency reference value associated with each component, it may be determined whether an abnormality has occurred or not. For example, if a difference which is greater than or equal to a predetermined ratio occurs, it may be identified that an abnormality has occurred in the corresponding component, and if a difference which is less than a predetermined ratio occurs, it may be identified that an abnormality has not occurred in the corresponding component.

The predetermined ratio may mean a maximum value of a change ratio (e.g., a maximum ratio of variation) which the level of the frequency associated with the component may have, in the normal operation.

When the image forming apparatus includes a plurality of gears, the rotational frequency of each of the plurality of gears may be the same or the gear mesh frequency may be the same.

When it is identified whether an abnormality occurs in a gear, in order to distinguish the gear from another gear, it may be determined whether each of a plurality of gears has an abnormality based on frequency information. The frequency information may includes the frequency information associated with the rotational frequency and the frequency information associated with the gear mesh frequency of each of a plurality of gears, from among the analyzed frequency information.

Accordingly, a component in which an abnormality occurs may be identified in the image forming apparatus.

An action may be taken, in response to a state (e.g., an operational state) of a component in which an abnormality occurs, from among a plurality of components.

For example, the action information associated with each of the plurality of predetermined states may be stored. Here, the plurality of predetermined states may include two states including the normal state and the abnormal state in some examples, or three or more states in other examples.

In addition, a state (e.g., an operational state) associated with a component in which an abnormality occurs may be determined based on the analyzed frequency. For example, by using a determination criterion for each of a plurality of states, it may be determined what state, from among a plurality of states, is associated with a component in which an abnormality occurs.

The determination criteria for each of the plurality of states may include an expected value or range of a frequency level associated with the component for each operational state of the component. In addition, the determination criteria for each of the plurality of states may be set to be different for each component.

By using the stored action information, an action associated with the determined state may be performed.

Whether a plurality of components have an abnormality may be identified using the level information according to the time of the vibration of the printer engine.

Accordingly, operation timing information, which is information on the time when each of a plurality of components starts an operation, may be stored first.

The level of vibration according to time may be analyzed by using vibration information of the printer engine. Here, the level of vibration may be represented using root mean square (RMS), but is not limited thereto.

The level according to the analyzed time and the plurality of stored operation timing information, may be taken into consideration in order to determine whether each of the plurality of components has an abnormality.

For example, by comparing the level of the vibration during normal operation and the level of the analyzed vibration, the timing when the predetermined ratio is exceeded may be identified. The predetermined ratio may refer to a maximum value of a change rate (e.g., a maximum variation ratio) of the level of vibration, which a component may have during the normal operation.

In addition, a component in which an abnormality occurs may be identified from among a plurality of components, by identifying the component that is associated with the timing when the predetermined ratio is exceeded, using a plurality of operation timing information associated with each of the plurality of components.

In some examples, the above-described operation of determining whether there is an abnormality in a plurality of components using the level information according to the time of the vibration of the printer engine may be implemented through a server.

For example, a component in which an abnormality has occurred may be identified by transmitting the level information according to the time of the vibration of the printer engine to the server, generating the diagnosis result by performing an operation to determine whether a plurality of components have an abnormality using the level information according to the time of vibration received by the server, and receiving the diagnosis result from the server.

As described above, a control method of the image forming apparatus according to an example, may identify a component in which an abnormality has occurred, from among a plurality of components, by using the vibration information of the printer engine and a plurality of frequency information associated with the plurality of components, in order to reduce service cost and downtime.

In addition to identifying a normal state and an abnormal state for each of the plurality of components, a component which has not yet been failed but is expected to fail may be identified. Accordingly, the corresponding component may be replaced before the component fails, to prevent an abnormal or unexpected operation of the image forming apparatus.

The control method of the image forming apparatus as FIG. 11 may be implemented by the image forming apparatus having the configuration of FIG. 1 or FIG. 2, or by an image forming apparatus having another configuration.

In addition, the control method of the image forming apparatus as described above may be implemented by processor-readable data and instructions, for example as at least one execution program, for executing the control method of the image forming apparatus as described above, and the execution program may be stored in a non-transitory computer readable medium.

A non-transitory readable medium may refer to a medium that stores data for a short period of time such as a register, a cache, and a memory, but semi-permanently stores data and is readable by the apparatus. In particular, the various applications or programs described above may be stored and provided on non-volatile readable media such as CD, DVD, hard disk, Blu-ray disk, USB, memory card, ROM.

It is to be understood that not all aspects, advantages and features described herein may necessarily be achieved by, or included in, any one particular example. Indeed, having described and illustrated various examples herein, it should be apparent that other examples may be modified in arrangement, and detail is omitted.

The invention claimed is:

1. An image forming apparatus comprising:
   a printer engine to form an image;
   a sensor to output vibration information associated with a vibration of the printer engine comprising a plurality of components;
   a memory to store a plurality of frequency reference values associated with the plurality of components when in a state of normal operation, wherein the plurality of frequency reference values comprise multiple first component frequency reference values for a first component of the plurality of components, and multiple second component frequency reference values for a second component of the plurality of components; and a processor to:
determine, based on the output vibration information, the multiple first component frequency reference values, and the multiple second component frequency reference values, which of the first component and the second component of the printer engine has an abnormality.

2. The image forming apparatus of claim 1, wherein the processor is to determine which of the first component and the second component has the abnormality based on at least one selected from the group consisting of: frequency analysis information of the output vibration information, and level analysis information according to time of the output vibration information.

3. The image forming apparatus of claim 1, comprising:
a communication device to communicate with a server,
the processor to control the communication device to receive, from the server, whether the first component or the second component of the printer engine has the abnormality.

4. The image forming apparatus of claim 1, wherein the output vibration information indicates that both the first component and the second component potentially has the abnormality, and wherein the processor is to distinguish which of the first component and the second component has the abnormality using the multiple first component frequency reference values and the multiple second component frequency reference values.

5. The image forming apparatus of claim 4, wherein a first of the multiple first component frequency reference values and a first of the multiple second component frequency reference values are at a same frequency, and a second of the multiple first component frequency reference values and a second of the multiple second component frequency reference values are at different frequencies.

6. The image forming apparatus of claim 5, wherein the second of the multiple first component frequency reference values and the second of the multiple second component frequency reference values being at different frequencies enables the processor to distinguish which of the first component and the second component has the abnormality based on the output vibration information.

7. The image forming apparatus of claim 1, wherein the first component comprises a fuser, and
wherein the multiple first component frequency reference values comprise plural frequencies selected from the group consisting of a rotational frequency of a fuser belt included in the fuser, a rotational frequency of a gear included in the fuser, and a gear mesh frequency of the gear.

8. The image forming apparatus of claim 1, wherein the first component comprises a gear, and
wherein the multiple first component frequency reference values comprise a rotational frequency of the gear, and a gear mesh frequency of the gear.

9. The image forming apparatus of claim 1, wherein the processor is to:
analyze an initial frequency of the vibration based on the output vibration information that is output from the sensor when the image forming apparatus operates initially, and determine whether the first component or the second component has the abnormality based on the initial frequency and frequency analysis information of the output vibration information.

10. The image forming apparatus of claim 1, comprising:
a memory to store operation timing information associated with each of the plurality of components when in the state of normal operation,
wherein the processor is to determine whether the first component or the second component has the abnormality according to a time of the output vibration information and the operation timing information.

11. The image forming apparatus of claim 1, comprising:
a memory to store action information associated with each of a plurality of predetermined states,
wherein the processor is to:
determine a state associated with a component in which an abnormality occurs, from among the plurality of predetermined states, based on frequency analysis information of the output vibration information, and
perform an action associated with the determined state based on the stored action information.

12. The image forming apparatus of claim 1, wherein the output vibration information is output by the sensor in a warm-up mode or a calibration mode.

13. The image forming apparatus of claim 1, wherein the plurality of frequency reference values comprise values of vibration at respective frequencies.

14. A method comprising:
receiving, by a system comprising a hardware processor, vibration information associated with a vibration of a printer engine comprising a plurality of components;
storing, in a memory, a plurality of frequency reference values associated with the plurality of components when in a state of normal operation, wherein the plurality of frequency reference values comprise multiple first component frequency reference values for a first component of the plurality of components, and multiple second component frequency reference values for a second component of the plurality of components; and
determining, by the system based on the vibration information, the multiple first component frequency reference values, and the multiple second component frequency reference values, which of the first component and the second component of the printer engine has an abnormality.

15. The method of claim 14, wherein the vibration information indicates that both the first component and the second component potentially has the abnormality, the method comprising:
distinguishing, by the system, which of the first component and the second component has the abnormality using the multiple first component frequency reference values and the multiple second component frequency reference values.

16. The method of claim 15, wherein a first of the multiple first component frequency reference values and a first of the multiple second component frequency reference values are at a same frequency, and a second of the multiple first component frequency reference values and a second of the multiple second component frequency reference values are at different frequencies.

17. The method of claim 16, wherein the second of the multiple first component frequency reference values and the second of the multiple second component frequency reference values being at different frequencies enables the system to distinguish which of the first component and the second component has the abnormality based on the vibration information.

18. A non-transitory computer readable medium comprising instructions that upon execution cause a system to:
receive vibration information associated with a printer engine comprising a plurality of components;
store, in a memory, a plurality of frequency reference values associated with the plurality of components when in a state of normal operation, wherein the plurality of frequency reference values comprise multiple first component frequency reference values for a first component of the plurality of components, and multiple second component frequency reference values for a second component of the plurality of components; and
determine, based on the vibration information, the multiple first component frequency reference values, and the multiple second component frequency reference values, which of the first component and the second component of the printer engine has an abnormality.

19. The non-transitory computer readable medium of claim 18, wherein the vibration information indicates that both the first component and the second component potentially has the abnormality, and
wherein the instructions upon execution cause the system to distinguish which of the first component and the second component has the abnormality using the multiple first component frequency reference values and the multiple second component frequency reference values.

20. The non-transitory computer readable medium of claim 19, wherein a first of the multiple first component frequency reference values and a first of the multiple second component frequency reference values are at a same frequency, and a second of the multiple first component frequency reference values and a second of the multiple second component frequency reference values are at different frequencies, and
wherein the second of the multiple first component frequency reference values and the second of the multiple second component frequency reference values being at different frequencies enables the instructions to distinguish which of the first component and the second component has the abnormality based on the vibration information.

\* \* \* \* \*